United States Patent Office 3,606,378
Patented Sept. 20, 1971

3,606,378
INERTIAL ELECTROMAGNETIC LOCKING MECHANISM FOR SAFETY BELTS IN MOTOR VEHICLES
Luka Prostran, 50 Jakuba Kuburovica,
Zemun-Beograd, Yugoslavia
Filed June 18, 1969, Ser. No. 834,395
Int. Cl. B60r 21/10
U.S. Cl. 280—150                                        4 Claims

ABSTRACT OF THE DISCLOSURE

The holder of a safety belt is connected to a cable which is wrapped around a spring-loaded drum which is rotatably supported on a carrier attached to a vehicle such that the holder can be moved towards and away from the carrier by winding and unwinding of the cable on the drum. A toothed member rotates with the drum and is engageable by a spring loaded pawl to lock the drum when the pawl is acted on by an energized electromagnet, the latter being energized by closing of a switch of an energizing circuit by a swinging pendulum when the vehicle acceleration or deceleration exceeds a predetermined magnitude.

BRIEF SUMMARY OF THE INVENTION

The invention relates to an inertial electromagnetic mechanism for safety belts in motor vehicles, and the mechanism is suitable for mounting in all passenger cars for the purpose of protecting passengers against injuries caused in cases of sudden stops, collisions, turn-overs and similar accidents and particularly by keeping the passengers in their seats and preventing them from being thrown from the vehicle or by striking hard materials within the vehicle.

An advantage of an inertial electromagnetic mechanism for safety belts compared with the existing safety belts is that the passenger during the ride has the full capability to move freely in his seat because the shoulder and lap safety belts do not offer the same hinderance as the known safety belts. Moreover, the mechanism according to this invention is extraordinarily elastic and when the vehicle is suddenly stopped or during a collision and the passenger is forceably urged against the belt, no injury is caused. A further advantage of the mechanism according to the invention is that the passengers are far more comfortable during the ride, since the belts do not limit their movements on the seat, this not being possible with the safety belts heretofore known.

More specifically, the belts according to the invention offer free movement of the wearer until the vehicle exceeds a predetermined acceleration or deceleration whereupon the belt becomes locked and the wearer immobilized.

In accordance with the invention, the seat belt apparatus comprises a belt, a holder for said belt, a carrier adapted for being secured to a support vehicle, and means connecting said carrier and holder to selectively lock the position of the holder relative to the carrier and to release the holder for displacement relative to the carrier, said means including a locking mechanism which can be locked and released, electromagnetic means having an energized state for locking the locking mechanism and a deenergized state in which the locking mechanism is released, and means responsive to acceleration and deceleration of said vehicle for energizing and deenergizing the electromagnetic means.

In particular the said means which is responsive to acceleration and deceleration of said vehicle comprises a pendulum supported by said carrier and coupled to said electromagnetic means for selectively energizing and deenergizing the same.

According to a preferred embodiment, the means connecting the carrier and holder comprises a rotatable drum supported by said carrier and a cable connected to said holder and drum for being wound and unwound on the drum. The locking mechanism comprises a member coupled with said drum for rotation therewith, said electromagnetic means acting on the latter member to lock and unlock the same and the drum therewith.

DETAILED DESCRIPTION

Figure 1:
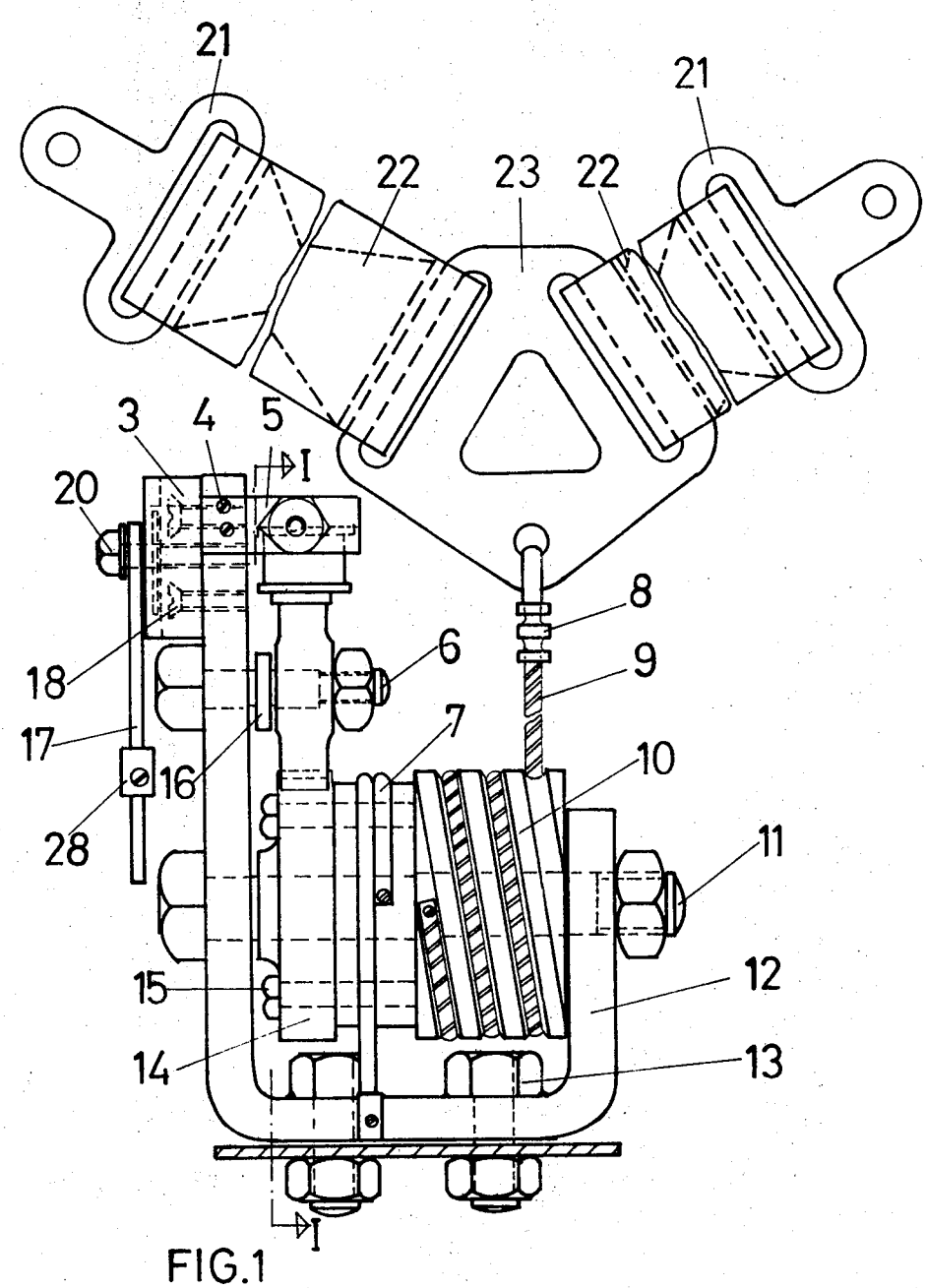
FIG. 1 is an elevation view of the apparatus of the invention used with shoulder belts.

In FIG. 1 there is shown an inertial electromagnetic mechanism for safety belts wherein a carrier 12 is secured by screws 13 to the floor of the vehicle. A drum 10 is rotatably mounted on a bolt 11 secured to carrier 12. The drum 10 has a peripheral surface with a helical screw thread in which a steel rope 9 is wound, one end of the rope 9 being connected to the drum 10 and the other end to a clamp 8 secured to holder 23 of shoulder belts. Around a cylindrical part of the drum 10 is wound a rubber spring one end of which is fastened to drum 10 while the other end is connected to the carrier 12.

The direction of the windings of the steel rope 9 is opposite to the direction of the windings of the rubber spring 7, so that when a passenger who is wearing the safety belts, moves away from the back of his seat, the steel rope 9 will be unwound from the drum 10 and therefore the rubber spring 7 will be stretched, and when the passenger resumes his initial position, the rope 9 will be wound up on the drum 10 by the action of the rubber spring 7. In this way, the safety belt will always be close to the body of the wearer. Since safety belts must always be close to the body of the wearer in order to avoid injuries caused by impact of the body against the belts, the apparatus of the invention satisfies a basic rule of safety.

On the bolt 11 is mounted a studded disc 14 with external teeth extending in one direction, the disc 14 being fastened with screws 15 to the drum 10.

Pivotably secured to the carrier 12 above the studded disc 14 is a ratchet pawl 1 having one end contacting the teeth of the studded disc 14 and the other end connected with a spring 19 to the carrier 12. Above the pawl 1 is an electromagnet 2 fixed on the carrier 12. The electromagnet 2 is supplied with current from the battery of the car when an energizing circuit is closed by a switch 3.

The energizing circuit will be closed when a pendulum 17 leaves its position of equilibrium, as a consequence of inertia (when the vehicle accelerates or decelerates beyond a particular magnitude), and connects two semicircular rings in the switch 3 by rotation around a screw 20.

Upon closing of the circuit the electromagnet 2 will attract the ratchet pawl 1 against the opposition of spring 19 and the pawl 1 locks the studded disc 14 and thereby the drum 10, so that the passenger wearing the safety belt 22 will be secured with his back against the back of the seat. Namely, the disc 14 is locked against rotation in a direction in which the cable can be unwound from disc 10, and by the action of spring 7 the cable 9 will be wound on disc 10. When the vehicle stops, the pendulum 17 returns to its vertical position and opens the circuit; thereby the attraction of the electromagnet 2 to the ratchet pawl is interrupted and the pawl is drawn back by the spring 19, therefore the studded disc 14 and the drum 10 are released, so that the passenger can freely move in the seat. The sensitivity of the pendulum i.e. the inertial power needed for activating the mechanism can be adjusted by moving a weight 28 along the lever of the pendulum 17.

Figures 2, 3, 4:
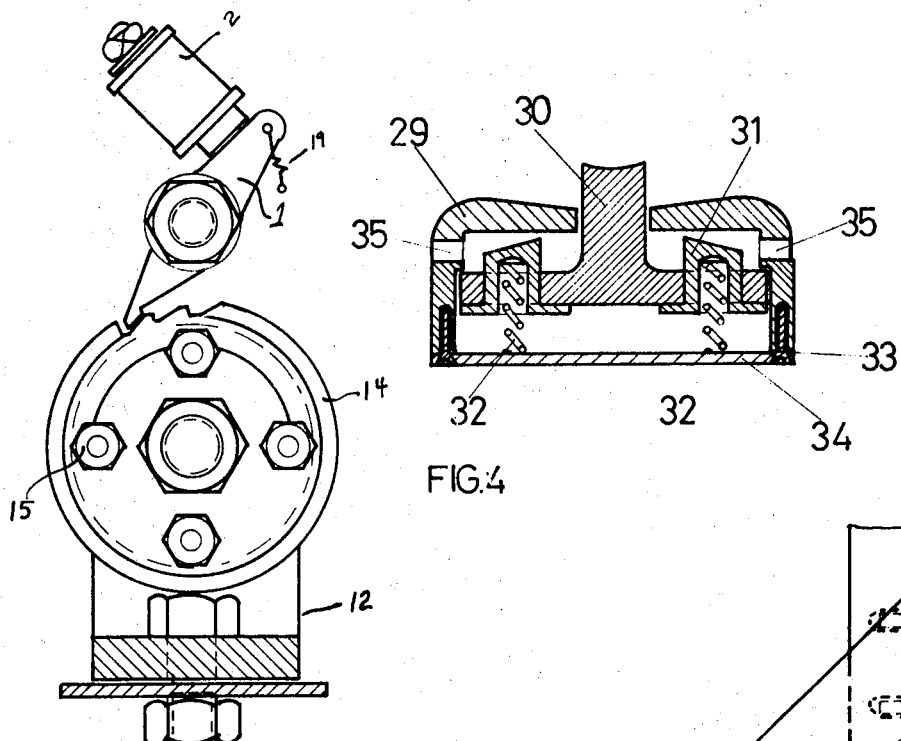
FIG. 2 is a cross-section taken along line I—I in FIG. 1.
FIG. 3 is a plan view of a support for receiving the buckles of the belts.
FIG. 4 is a section taken on line II—II in FIG. 3.

Safety shoulder belts 22 and lap belts 24 are connected by buckles 21 to support 25. The support 25 is shown in FIG. 4 and comprises a body 29 closed by a cover 34 by means of screws 33. The buckles 21 are pushed through openings 35 in the body 29 of the support and are secured by pins 31 arranged in a carrier 30. The pins 31 are displaced downwards during engagement, relative to the carrier 30, against the action of spring 34. During disengagement, the pins move downwards together with the carrier 30 whereby the safety belts can be unbuckled and removed from the wearer.

What is claimed is:

1. Safety belt apparatus comprising a belt; a holder for said belt; a carrier adapted for being secured to a support vehicle; means connecting said carrier and holder to selectively lock the position of the holder relative to the carrier and to release the holder for displacement relative to the carrier, said means including a locking mechanism which can be locked and released; electromagnetic means having an energized state for locking the locking mechanism and a deenergized state in which the locking mechanism is released; means responsive to acceleration and deceleration of said vehicle for energizing and deenergizing the electromagnetic means, said responsive means including a pendulum supported by said carrier and coupled to said electromagnetic means for selectively energizing and deenergizing the same; said connecting means including a rotatable drum supported by said carrier and a cable connected to said holder and drum for being wound and unwound on the drum; said locking mechanism comprising a member coupled with said drum for rotation therewith, said electromagnetic means acting on the latter member to lock and unlock the same and the drum therewith; resilient means acting on said drum to urge the same to an initial position in which the cable is wound on the drum, said cable being unwindable from the drum against the opposition of the resilient means; said member coupled with said drum having a periphery with teeth thereon, said locking mechanism comprising a pawl engaging said teeth to lock the drum, said electromagnetic means acting on said pawl to disengage the same from said teeth when the electromagnetic means is energized; said electromagnetic means comprising an energizing circuit including a switch means therein, said pendulum being swingable on said carrier to open and close the switch means in accordance with the magnitude of swing of the pendulum; and an adjustable weight on said pendulum for adjusting the swing thereof.

2. Apparatus as claimed in claim 1 wherein said teeth are inclined and the pawl is shaped to lock the drum against rotation in a direction in which the cable can be unwound from said drum, said drum adapted to be urged to an initial position by the resilient means acting thereon to wind the cable on the drum.

3. Apparatus as claimed in claim 2 wherein said drum has a threaded surface and said cable is windable in the threads of said surface.

4. Apparatus as claimed in claim 1 comprising a buckle on said belt and a support for releasably engaging said buckle, said support comprising a casing with an opening for entry of said buckle, a displaceable carrier in said casing, and spring-loaded pins supported in said carrier at the level of said opening.

References Cited

UNITED STATES PATENTS

| | | | |
|---|---|---|---|
| 2,708,966 | 5/1955 | Davis | 242—107UX |
| 2,825,581 | 3/1958 | Knight | 280—150 |
| 3,240,510 | 3/1966 | Spouge | 297—388X |

KENNETH H. BETTS, Primary Examiner

U.S. Cl. X.R.

242—107SB; 297—388